United States Patent [19]

Mathews et al.

[11] Patent Number: 5,671,098

[45] Date of Patent: Sep. 23, 1997

[54] ADAPTIVE PREAMPLIFIER FOR RESONANCE TUNING USEFUL IN A DISK DRIVE

[75] Inventors: Harlan Mathews, Boulder; Michael McNeil, Nederland; Michael A. Blatchley, Longmont, all of Colo.

[73] Assignee: Maxtor Corporation, San Jose, Calif.

[21] Appl. No.: 456,680

[22] Filed: Jun. 1, 1995

[51] Int. Cl.$^6$ ............................................. G11B 5/02
[52] U.S. Cl. ...................................... 360/67; 360/65
[58] Field of Search ................... 360/67, 65, 77.05, 360/73.03, 75, 33.1, 55, 37.1, 27, 51; 324/318; 369/54, 58, 59

[56] References Cited

U.S. PATENT DOCUMENTS 4,656,533  4/1987  Sakai et al. ............................ 360/65
4,963,806  10/1990  Shinohara et al. ............... 360/77.05 X
5,315,450  5/1994  Nagase et al. ............................ 360/65

*Primary Examiner*—Aristotelis M. Psitos
*Assistant Examiner*—Patrick Wamsley
*Attorney, Agent, or Firm*—Sheridan Ross P.C.

[57] ABSTRACT

A resonant frequency control circuit communicates with a head of a disk drive and the preamplifier of a read channel. The resonant frequency control circuit is useful in achieving peaking of a readback signal generated by reading data from a magnetic disk. The read channel also includes an equalizer circuit for enhancing equalization of the readback signal. A controller communicates with the read channel and the resonant frequency control circuit for, in one embodiment, selectively adding capacitance to that capacitance which is present in the read element of the head and the preamplifier. By controlling the resonant frequency, this desired signal peaking can be achieved, which is related to the frequencies of the coded data on the disk.

5 Claims, 4 Drawing Sheets

ADAPTIVE PREAMPLIFIER FOR RESONANCE TUNING USEFUL IN A DISK DRIVE

FIELD OF THE INVENTION

The present invention relates to a method and apparatus for controlling resonant frequency associated with a head and a preamplifier useful in reading data from a storage medium.

BACKGROUND OF THE INVENTION

Storage devices, such as disk drives, use transducers, commonly referred to as heads, in reading data or other information from storage media, such as disks. A read/write channel communicates with the output from the head for signal processing the readback signal obtained from the disk during the read operation. A conventional read/write channel typically includes a preamplifier for amplifying the readback signal and an equalizer that increases the amplitude of the readback signal and lowers the intersymbol interference. The functions of the equalizer contribute to enhancing the density of data stored on the disk. However, these read/write channel circuits also increase the amplitudes of noise components present in the readback signal. As a consequence, the output of the equalizer typically includes noise components having an amplitude boost that has a detrimental impact on desired processing of the readback signal.

With respect to reducing the amplitude and effect of noise components, instead of boosting the readback signal, including noise components, by means of the equalizer, it would be advantageous to increase the amplitude of the readback signal before it includes noise introduced by electronic components that follow the head. To accomplish this, the resonance of the head and preamplifier could be used. That is, using resonance related components of the head and the preamplifier, a resonant frequency can be made to occur within the frequency response associated with the readback signal. At this resonance, a peaking of the readback signal occurs. The resonant frequency generally equates to about twice the high frequency of the code associated with the data stored on the disk for a peak detection channel. Other detection schemes are possible, such as PRML, where the optimum resonant frequency would be different, such as at the high frequency of a 8/9 (0,4) PR4 channel. Storing data on the disk in a coded format is well-known. Coded data can be defined using the expression (d,k) where d is the minimum number of binary "0's" between binary "1's" and k is the maximum number of binary "0's" between consecutive binary "1's". Hence, a code of (1,7) indicates there is at least one binary "0" between binary "1's" but no more than seven binary "0's" between two binary "1's". For this code, the high frequency of the code occurs when there is one binary "0" between consecutive binary "1's".

Ideally, therefore, the resonance associated with these components of the disk drive would be used in creating the desired peaking of the readback signal. This has not been previously done because of the high tolerances of the head and preamplifier components. For example, the capacitance and the damping resistance associated with the preamplifier can vary from 30% to 60% of their nominal values. As a result, signal peaking is not consistently achieved at about twice the high frequency of the code. Instead, such peaking occurs at frequencies different from this optimum frequency associated with the coded data.

With the advent of programmable filters, it is now practically feasible to compensate for the head and preamplifier tolerances using adaptive equalization. Accordingly, the system resonance that includes the head resonance can be used to boost the amplitude of the appropriate frequency, without increasing the amplitudes of noise components.

SUMMARY OF THE INVENTION

In accordance with the present invention, an apparatus provides desired peaking of a readback signal generated by reading data stored on a storage medium, such as a magnetic disk, while avoiding the amplifying of noise components that are commonly introduced during processing of the readback signal. The apparatus includes a transducer or head having a read element. A preamplifier electrically communicates with the read element and receives the readback signal. The preamplifier increases the amplitude of the readback signal and typically introduces noise components into the readback signal. In addition, any noise components that it receives as part of the readback signal are amplified by the preamplifier.

The combination of the read element and the preamplifier are representable in a resonant circuit that includes resistance, inductance and capacitance. The arrangement and values of these passive electrical components have a resonant frequency associated with them. In order to optimize use of the resonant frequency in causing a peaking of the readback signal generated from the storage medium or disk, the resonant frequency is correlated with the coding scheme for the data stored on the disk. When reading the coded data on the storage medium, it has been found that it is advantageous for peak detection channels to achieve a resonant frequency that is about twice the high frequency of the coded data. That is, when coded data is read from the disk it has a high frequency associated with the particular code. To be able to achieve such a resonant frequency, the apparatus further includes a resonant frequency control circuit electrically connected between the read element and the preamplifier. This control circuit is useful in enabling the resonant frequency to be controlled so that it corresponds to about twice the high frequency of the coded data.

In one embodiment, the resonant frequency control circuit includes a plurality of selectable or controllable capacitors that are in parallel with each other. One or more of the capacitors are selected and thereby added to the resonant circuit to increase the capacitance. The increased capacitance causes the resonant frequency to decrease. Thus, if an initial capacitance of the resonant circuit is about twice the high frequency of any code that encodes the data residing on the disk, further capacitance can be selectively added to the resonant circuit as and when the code of the data changes. That is, when the high frequency of the code decreases, the starting or initial resonant frequency is caused to decrease as well.

Such an embodiment has application in zone bit recording (ZBR), where data is detected by the read element at a frequency that increases with increasing track radius. More particularly, in comparison with data stored on a first track relatively closer to an inner diameter of the disk, a second disk track that is relatively closer to the outer diameter of the disk will have data detected at a greater frequency. In such an embodiment, the resonant frequency control circuit is controllable to decrease the capacitance in accordance with the frequency at which the data is detected or read, with greater resonant frequencies being generated as the data is detected farther from the inner diameter of the disk.

In another embodiment, the resonant frequency control circuit also includes one or more selectable or controllable resistors arranged in parallel for changing the resistance of the head/preamplifier circuitry. The additional controllable resistance is particularly useful in desirably shaping the readback signal.

In addition to the preamplifier, the read/write channel of the apparatus includes an equalizer for producing an equalization that takes into account head and preamplifier variations including tolerances that typically are present in the head and preamplifier components. The equalizer is important in being able to successfully use the resonant frequency in providing a peaking of the readback signal.

The apparatus also includes a controller that communicates with the read/write channel and the resonant frequency control circuit. The controller includes means, such as software or firmware, for controllably adjusting the capacitance and/or resistance of the resonant frequency control circuit. In a disk that has ZBR, depending upon the disk position or track that is currently being read from, the controller is able to select capacitance and/or resistance values for achieving the desired resonant frequency that is a function of the frequencies of the coded data.

Based on the foregoing summary, a number of advantages of the present invention are readily seen. An apparatus is disclosed that achieves peaking of a readback signal by relying on its resonant frequency. Because this peaking occurs using the resonant frequency, boosting of noise components can be eliminated or reduced, thereby improving the signal-to-noise ratio (SNR) since the read element effectively contributes to equalization of the readback signal. The SNR of the storage device is also improved by allowing for more turns to be included in the read element, which augments the readback signal amplitude. The additional turns can be taken into account during the controlling of the resonant frequency. Furthermore, preamplifiers with greater input capacitance can be utilized since the resonant frequency control circuit can be used to further increase the overall head/preamplifier capacitance to the desired value. Such preamplifiers generate less noise, in comparison with preamplifiers having less input capacitance. The apparatus also enables the resonant frequency to be modified during operation, for example, when the disk has a ZBR configuration. From a disk drive manufacturing standpoint, disk drive yields should increase because of the ability to self-optimize the disk drive by adjustment of resonant frequency control circuit components.

Additional advantages of the present invention will become readily apparent from the following discussion, particularly when taken together with the accompanying drawings.

DETAILED DESCRIPTION

Figure 1:
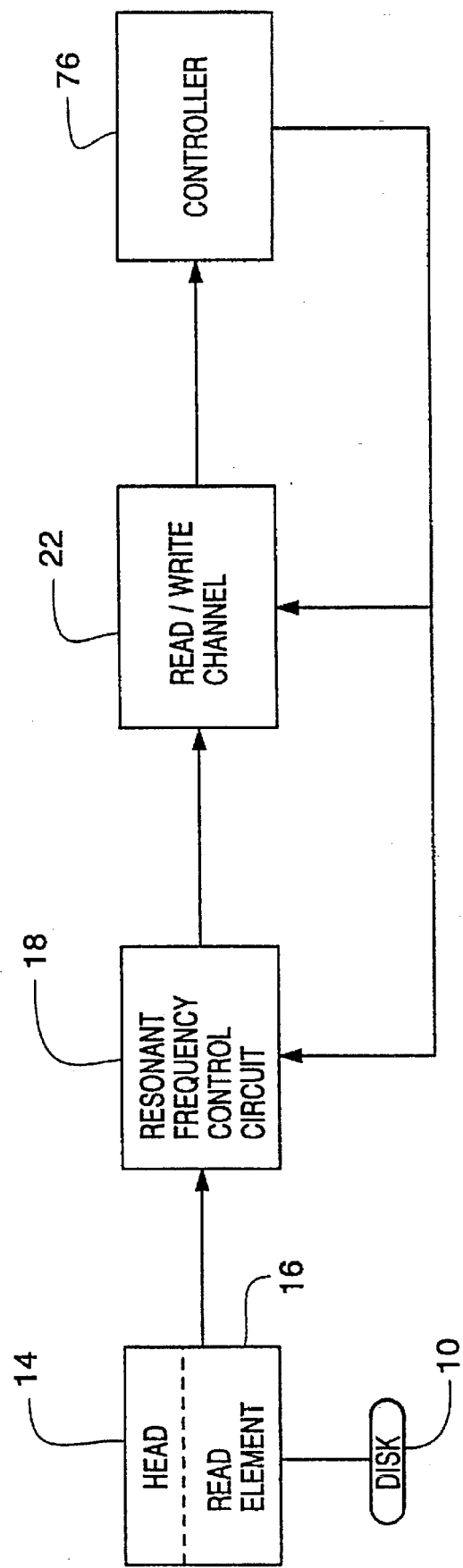
FIG. 1 is a block diagram of the present invention.

With reference to FIG. 1, a block diagram illustrates the major aspects of the present invention for controlling resonant frequency when reading data or other information from a storage medium, such as a disk 10 of a disk drive. A head or transducer 14 typically has a read element 16 that is used in accessing or reading information from the disk 10 as the head 14 is suitably positioned relative to a disk track. The head 14 outputs a readback signal that is sent to signal processing circuitry in the disk drive. In accordance with a key feature of the present invention, the readback signal is received by a resonant frequency control circuit 18 that is included as part of a signal processing channel for use in controlling the resonant frequency of the readback signal. Briefly, the resonant frequency control circuit 18 controls the readback signal so that the resonant frequency thereof is at a certain frequency or within a narrow range of frequencies, which frequencies are a function of data or other information encoded on the disk 10. With respect to such encoding, different configurations are available. In one embodiment, the data has a (1,7) encoding, which correlates with a specific high frequency when such encoded data is read from the disk. With respect to a resonant or peaking frequency for particular coded data, it has been determined as part of the invention that the optimum resonant frequency is about twice the high frequency of the coded data when read with a peak detection channel.

Figure 2:
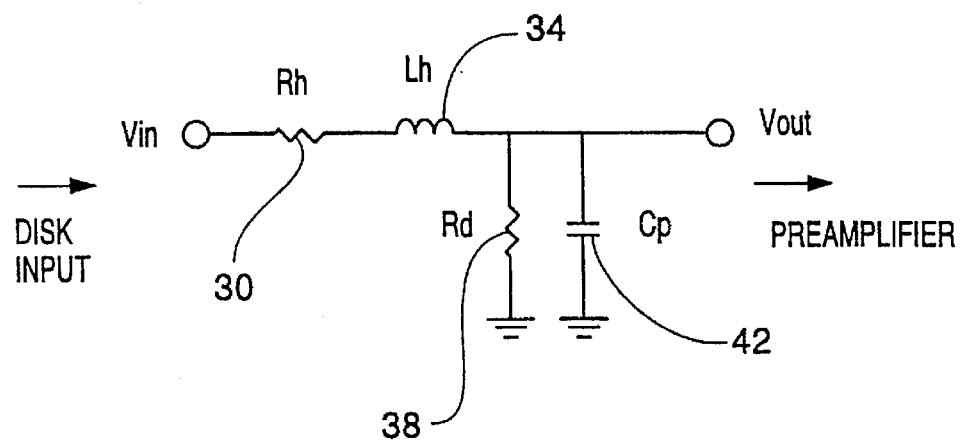
FIG. 2 schematically illustrates electrical passive components associated with the read element and the preamplifier of the read channel that are involved in generation of the resonant frequency associated with the head/preamplifier.

The output of the resonant frequency control circuit 18 communicates with a read/write or signal processing channel 22, which includes a number of signal processing components. The read/write channel 22 includes a preamplifier 26 (FIG. 3), which amplifies the readback signal that it receives from the resonant frequency control circuit 18. The preamplifier 26 has passive electrical components including capacitance and resistance associated with it, which contribute to the magnitude of the resonant frequency. In that regard, an electrical schematic representation of the components of interest in defining the resonant frequency for the readback signal is illustrated in FIG. 2. This circuit is representative of the head 14 and preamplifier 26 electrical components that influence the magnitude of the resonant frequency. The circuit includes a head resistance Rh 30 and a head inductance Lh 34 that are in series. These resistive and inductive components communicate with a damping resistance Rd 38 and a capacitance Cp 42 associated with the preamplifier 26. The output of the circuit of FIG. 2 is amplified by the preamplifier 26 for subsequent processing by other circuitry or components of the read/write channel 22.

The transfer function for the circuit of FIG. 2 is defined as:

$$T(s) = V_{in}/V_{out} = \frac{1}{s^2 \cdot Lh \cdot Cp + s \cdot (Cp \cdot Rh + Lh/Rd) + (1 + Rh/Rd)}$$

T(s) can be written in the form of:

$$T(s) = \frac{1}{S^2 + S\frac{Wr}{Q} + Wr^2}$$

where the resonant frequency of this circuit is defined as:

$$f_r = \frac{1}{2 \cdot \pi} \cdot \sqrt{\frac{(1 + Rh/Rd)}{Lh \cdot Cp}}, \text{ and } W_r = 2\pi f_r$$

Then Q for this circuit is defined as:

$$Q = \frac{Rd \cdot Lh \cdot Cp \cdot 2 \cdot \pi \cdot f_r}{Rd \cdot Rh \cdot Cp + Lh}$$

With respect to the resonance frequency, as can be understood from the mathematical representation for $f_r$, as additional capacitance is included, the value of the denominator Lh·Cp increases due to increasing the overall capacitance that includes Cp. Because the denominator increases in magnitude, the overall expression $$\frac{1 + Rh/Rd}{Lh \cdot Cp}$$

decreases in magnitude, whereby the magnitude of the resonant frequency moves down or decreases.

Figure 3:
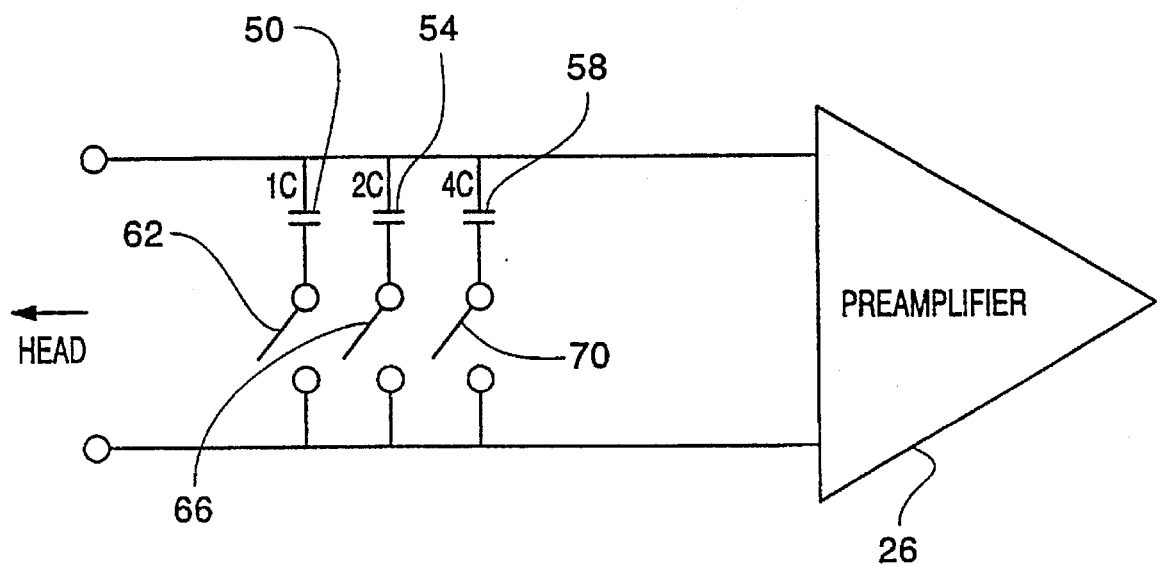
FIG. 3 illustrates one embodiment of a resonant frequency control circuit that includes selectively connectable capacitors.

Referring to FIG. 3, an implementation of the resonant frequency control circuit 18 is provided. In this embodiment, the resonant frequency control circuit 18 includes a plurality of capacitors, 50, 54, 58 that are electrically connectable and are in parallel with each other. Capacitor 50 is connected in series with a switch 62, capacitor 54 is connected in series with a switch 66 and capacitor 58 is connected in series with a switch 70. For each of these switches 62, 66, 70 that are in a closed position or state, such capacitance is added to the capacitance of the head/preamplifier capacitance Cp. The magnitude associated with the head/preamplifier capacitance is a function of each of the capacitances 50, 54, 58 that is added to the circuit by way of switch closure and the value of the capacitance that is added to the circuit. Specifically, the resulting capacitance, based on the parallel capacitor or capacitors having its or their parallel associated switches 62, 66, 70 in a closed state, is in parallel with the head/preamplifier capacitance Cp. Including one or more of the capacitors 50, 54, 58 in the resonant frequency control circuit 18 controls, adjusts or otherwise affects the magnitude of the resonant frequency $f_r$. In one embodiment, the capacitors 50, 54, 58 are binary weighted in which capacitor 54 has twice the capacitance of capacitor 50 and capacitor 58 has four times the capacitance of capacitor 50. Such a configuration allows for eight levels of selectable capacitance increase. In other embodiments, there may be greater of fewer than three capacitors connected in parallel as part of the resonant frequency control circuit 18. For example, instead of three capacitors, there might be four or more capacitors connected in parallel, with each of the capacitors being binary weighted. In another example, the plurality of capacitors might not be binary weighted but might have values based on other criteria, such as a percentage value difference from the other parallel capacitors. Fewer capacitors might also be used as part of the resonant frequency control circuit, such as a single capacitor having a capacitance that is determined for the particular disk drive and with the total capacitance not changing during operation or use. Such an embodiment has utility where the frequency of the coded data stored on the storage medium or the disk 10 does not change and the value of the single capacitance depends upon the high frequency of the coded data.

The read/write channel 22, in addition to the preamplifier 26, includes a number of other signal processing components including an equalizer circuit that controls the amplitude of the readback signal and also regulates the signal frequency bandwidth of the read/write channel 22. The equalizer circuit enables the pulse width of the readback signal to be advantageously reduced in duration to increase the data density on the disk 10. The equalizer circuit is also useful in compensating for the head/preamplifier component tolerances. That is, for a disk drive having a particular head 14 and preamplifier 26, the equalizer circuit is programmed or adjusted when the disk drive is manufactured in accordance with the actual values of these head/preamplifier electrical components. With these tolerances compensated for, the head/preamplifier resonance is used to boost the amplitude of the readback signal at the resonant frequency, instead of amplifying the readback signal using components of the read/write channel 22 that might introduce noise which is undesirably amplified. Since the present invention already has a boosted readback signal because it makes use of the head/preamplifier resonance, noise signal components are not boosted to the same degree as in the prior art and the overall signal-to-noise ratio (SNR) is thereby improved. Relatedly, since the head/preamplifier resonant frequency can be controlled, more windings or turns can be included with the read element 16 of the head 14, which improves the signal amplitude and the SNR. That is, the change in inductance due to the additional turns in the head/preamplifier resonance circuit can be taken into account using the resonant frequency control circuit 18 to still provide the readback signal at the desired resonant frequency.

As represented in FIG. 1, a controller 76 communicates with the read/write channel 22 and the resonant frequency control circuit 18. The controller 76 typically includes a microprocessor or a signal processor that is involved in a number of functions related to proper operation of the disk drive including transferring data relative to the disk 10 and proper positioning of the head 14 relative to the disk 10. In the context of the present invention, the controller 76 includes hardware and/or software for use in controlling, in certain embodiments, the magnitude of the added or extra capacitance by closing/opening the switches 62, 66, 70. Depending upon the high frequency of the coded data, for example, one or more of the capacitors 50, 54, 58 is included as part of the electrical components that result in a peaking or resonant frequency that is optimum, which is about twice the high frequency of the data coded on the disk 10. As can be understood, the resonant frequency can only be decreased, not increased, since capacitance is being added, not removed. Hence, the initial head/preamplifier resonance (i.e., without extra capacitance from the resonant frequency control circuit 18) is the highest frequency and should be at least two times the high frequency of the coded data that occurs when the encoded data is read.

Figure 4:
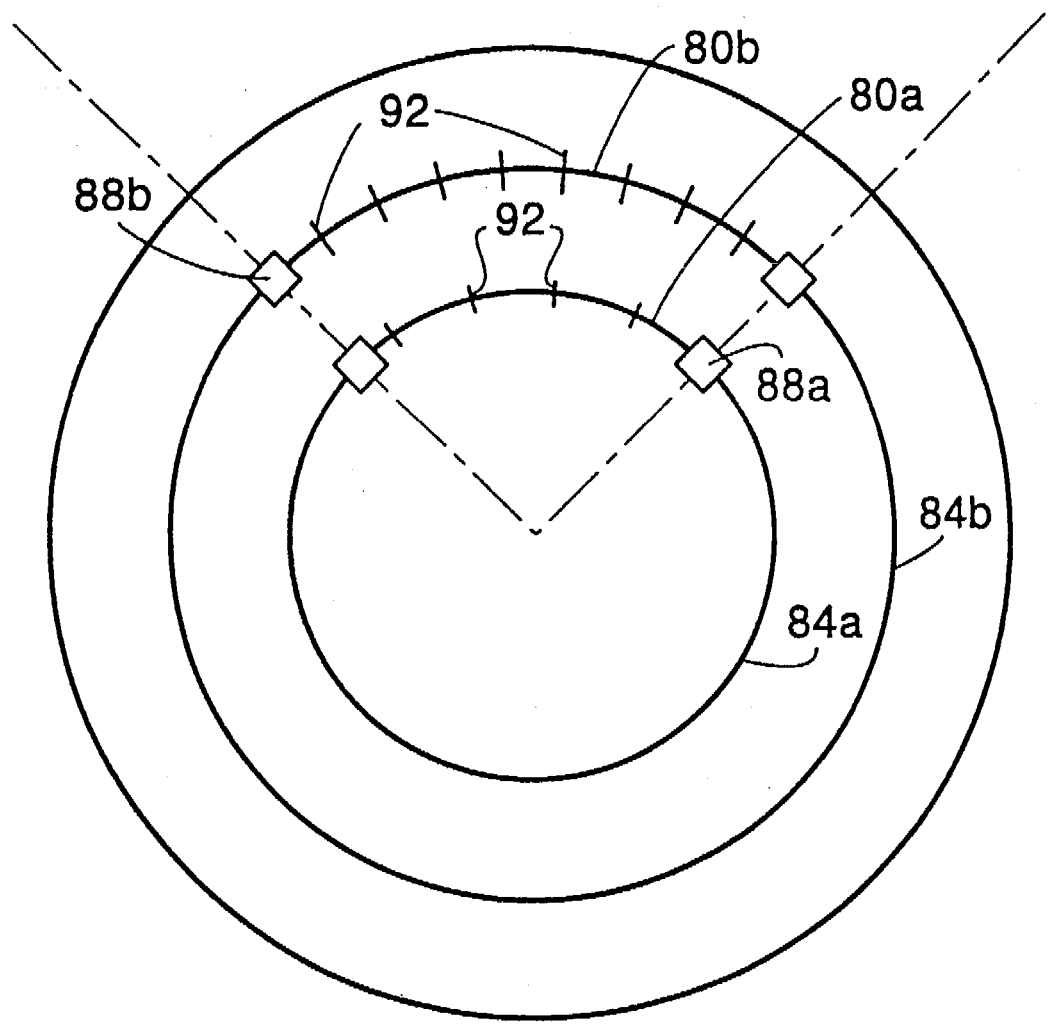
FIG. 4 illustrates a disk having zone bit recording of data.

With reference to FIG. 4, one embodiment in which the resonant frequency associated with the head/preamplifier is controlled involves a disk drive that has zone bit recording (ZBR). In such a drive, data fields 80 are defined on disk tracks 84, with the data fields containing data and being disposed within servo fields 88 having servo information useful in properly positioning the head 14 relative to a particular disk track 84. With respect to disk track 84a, there are a number of data bytes 92 stored in the data field 80a. For track 84b, there are also a number of data bytes 92 stored therein. For a ZBR embodiment, the data fields and the data bytes therein are read by the read element 16 of the head 14 at a frequency that increases with increasing track radius. In the context of disk tracks 84a, 84b, the data bytes in data field 84b are read at a greater frequency than the data bytes 92 in data field 84a. In order that desired peaking of the readback signal occur for both of these data fields on different tracks, the head/preamplifier resonant frequency must change. Specifically, as the head 14 moves to inner diameter tracks or zones, the data rate lowers so that the new optimum head/preamplifier resonant frequency decreases. Consequently, additional capacitance 50, 54 and/or 58 is switched in using switches 62, 66 and/or 70 under control of the controller 76 in order to compensate for the different coded data and achieve the new lower resonant frequency. In the case of the embodiment in which the resonant frequency control circuit 18 includes the three capacitors 50, 54, 58 connected in parallel and with their capacitances being binary weighted, eight different levels of capacitance increase can be achieved, which is sufficient to optimize each zone of a typical ZBR drive. In other embodiments, it may be useful to adjust the resonant frequency when it is determined that the data error rate, when reading data from the disks, is too great and peaking at a different frequency may overcome such errors.

Figure 5:
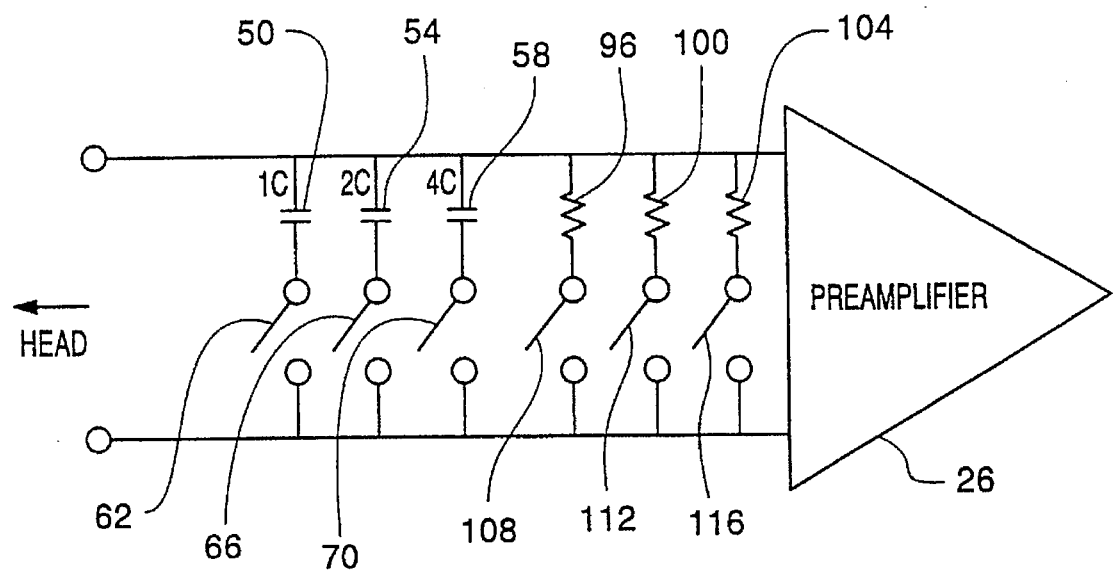
FIG. 5 illustrates a second embodiment of the resonant frequency control circuit that also includes selectively connectable resistors.
Figure 6:
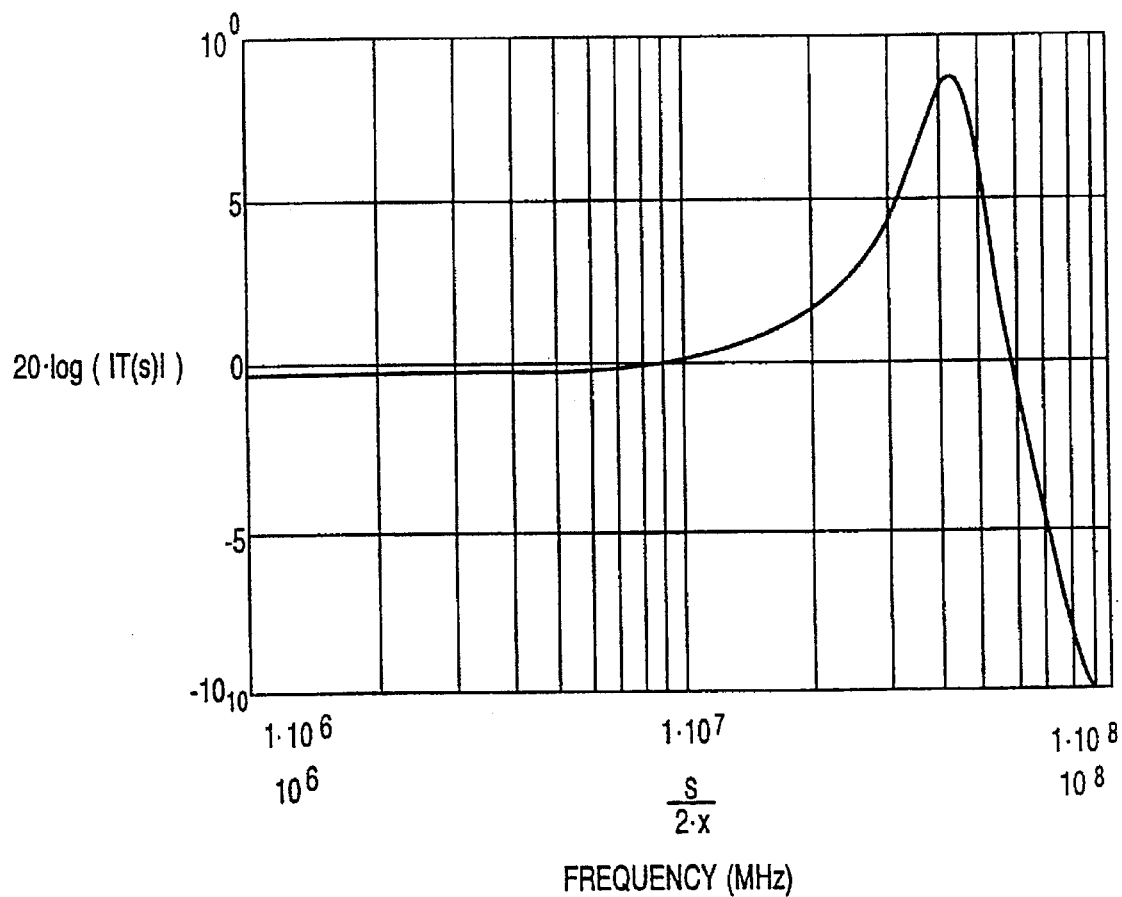
FIG. 6 graphically illustrates frequency response for a readback signal including peaking using a desired resonant frequency.

With reference to FIG. 5, another embodiment of the invention is described. As seen in FIG. 5, in addition to extra capacitance that is included to affect the resonant frequency associated with the head/preamplifier, extra resistor(s) 96, 100, 104 can also be selectively added, which increase(s) the damping resistance associated with the resonant frequency circuit. Like the capacitors 50, 54, 58, the resistors 96, 100, 104 are added to the resonant frequency control circuit using switches 108, 112, 116, respectively. One or more of such resistors 96, 100, 104 are added in some cases because it is necessary or desirable to enhance the sharpness of the frequency response for the readback signal by dampening out and/or broadening the peaking of the readback signal. That is, adding of further capacitance may result in a readback signal that has too great and/or too sharp a peak at the resonant frequency. With reference to FIG. 6, a desired frequency response for a readback signal is illustrated having the transfer function T(s). In the illustrated embodiment, the values of the selectively includable resistors 96, 100, 104 can also be binary weighted or their magnitudes can be based on some other criteria. Like the inclusion of extra capacitance, the extra resistance is added in parallel using the controller 76, which regulates the closing/opening of the switches 108, 112, 116. In determining whether or not to include additional resistance and the magnitude of any additional resistance, for a particular resonant frequency, the frequency response associated with the readback signal can be monitored to check for the need or desirability to dampen out and/or broaden the peaking of the frequency response at the resonant frequency. Including resistance in parallel reduces the resulting resistance and can only further broaden and/or dampen the peaking. Thus, the initial damping resistance (i.e., without extra resistance in parallel) should be of a magnitude that provides desired peaking for the case where no extra capacitance has been added.

The foregoing discussion has been presented for purposes of illustration and description. Further, the description is not intended to limit the invention to the form disclosed herein. Variation and modification commensurate with the above teachings, within the skill and knowledge of the relevant art, are within the scope of the present invention. The embodiments described herein above are further intended to explain the best modes presently known of practicing the invention and to enable others skilled in the art to utilize the invention as presented, or in other embodiments, and with the various modifications required by their particular applications or uses of the invention. It is intended that the appended claims be construed to include alternative embodiments to the extent permitted by the prior art. The most obvious variation of the above teaching would apply to digitally-sampled read channels, commonly known as PRML. Such channels have more limited bandwidth response than the peak detection example described above. Such digital channels would also benefit from the invention and would necessarily utilize resonant frequencies whose optimum values are lower relative to the wider bandwidth peak detector. The extension of the invention to such digital channels is therefore obvious.

With regard to such digitally-sampled read channels, based on theoretical analyses, the resonant frequency is about 1.0 times the high frequency of coded data residing on the disk for 8/9 (0,4) PR4 digital channel detectors; about 1.6 times the high frequency of coded data residing on the disk for 2/3 (1,7) $E^2PR4$; and about 1.5 times the high frequency of coded data residing on the disk for 2/3 (1,7) EPR4. As should be appreciated, the resonant frequency may differ with respect to other encoding algorithms or detection techniques.

What is claimed is:

1. A method for reading data from a disk in a disk drive to enhance a readback signal, comprising:

providing a disk drive that includes:

a disk having data at a number of positions on said disk;

a transducer selectively positioned relative to said disk and outputting a readback signal having an amplitude;

a read/write channel including a preamplifier for processing said readback signal; and a resonant frequency control circuit communicating with said transducer for increasing said amplitude of said readback signal;

positioning said transducer relative to a first position on said disk with first data to be read from said disk using said transducer;

controlling said resonant frequency control circuit to provide a first capacitance;

reading said first data from said disk to generate said readback signal having a first resonant frequency based on said first capacitance;

applying said readback signal having said first resonant frequency to said read/write channel including said preamplifier after said reading said first data step;

positioning said transducer relative to a second position on said disk with second data to be read from said disk using said transducer;

decreasing said first capacitance of said resonant frequency control circuit to provide a second capacitance at said disk second position after said reading said first data step;

reading said second data from said disk to generate said readback signal having a second resonant frequency based on said second capacitance;

applying said readback signal having said second resonant frequency to said read/write channel after said reading said second data step;

positioning said transducer relative to a third position on said disk with third data to be read from said disk using said transducer;

increasing said second capacitance of said resonant frequency control circuit to provide a third capacitance at said disk third position after said reading said second data step;

reading said third data from said disk to generate said readback signal having a third resonant frequency based on said third capacitance; and applying said readback signal having said third resonant frequency to said read/write channel after said reading said third data step.

2. A method, as claimed in claim 1, wherein:

said first resonant frequency is also dependent on impedance of said preamplifier and said transducer.

3. A method, as claimed in claim 1, wherein:

said controlling step includes determining said first resonant frequency depending on coded data residing on said disk.

4. A method, as claimed in claim 1, wherein:

said controlling step includes modifying resistance of said resonant frequency control circuit at the same time said first capacitance is provided.

5. A method, as claimed in claim 1, wherein:

said controlling step includes determining said first capacitance as a function of the frequency of coded data residing on said disk.

* * * * *